US012330420B2

(12) United States Patent
Jeon

(10) Patent No.: US 12,330,420 B2
(45) Date of Patent: Jun. 17, 2025

(54) CLEANING UNIT, SUBSTRATE PROCESSING APPARATUS INCLUDING THE SAME, AND HEAD CLEANING METHOD

(71) Applicant: SEMES CO., LTD., Cheonan-si (KR)

(72) Inventor: Hahn Seok Jeon, Cheonan-si (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 198 days.

(21) Appl. No.: 18/069,413

(22) Filed: Dec. 21, 2022

(65) Prior Publication Data

US 2023/0211610 A1 Jul. 6, 2023

(30) Foreign Application Priority Data

Dec. 30, 2021 (KR) ........................ 10-20210192399

(51) Int. Cl.
*B41J 2/165* (2006.01)
*B41J 2/175* (2006.01)
*B41J 2/18* (2006.01)

(52) U.S. Cl.
CPC ....... *B41J 2/16552* (2013.01); *B41J 2/16523* (2013.01); *B41J 2/16532* (2013.01); *B41J 2/17596* (2013.01); *B41J 2/18* (2013.01)

(58) Field of Classification Search
CPC ................................................... B41J 2/16552
See application file for complete search history.

(56) References Cited

U.S. PATENT DOCUMENTS

2006/0274110 A1* 12/2006 Kang .................. B41J 2/16552 347/33
2009/0278884 A1* 11/2009 Harada ................ B41J 2/16585 347/30
2016/0311225 A1* 10/2016 Hara .................... B41J 2/16508
2020/0254761 A1* 8/2020 Levy ........................ B41J 2/165
2022/0016888 A1* 1/2022 Shinoda ............... B41J 2/16526
(Continued)

FOREIGN PATENT DOCUMENTS

JP 2000272148 A * 10/2000
JP 2002-178529 A 6/2002
JP 2008-201021 A 9/2008
(Continued)

OTHER PUBLICATIONS

English translation of JP2000272148A to Nakamura, "Maintenance Mechanism for Ink Jet Head"; retrieved via FIT database.*
(Continued)

*Primary Examiner* — Shelby L Fidler
(74) *Attorney, Agent, or Firm* — Harness, Dickey & Pierce, P.L.C.

(57) ABSTRACT

Disclosed is a substrate processing apparatus. The substrate processing apparatus includes a head unit including a head having at least one nozzle for ejecting a treatment liquid to a substrate and a cleaning unit that cleans the head, wherein the cleaning unit includes a first cleaning member that sprays a cleaning liquid to the head; and a second cleaning member that forms a suction space in combination with the head when being in close contact with the head, and removes impurities attached to the head by providing a reduced pressure to the suction space.

12 Claims, 10 Drawing Sheets

(56) References Cited

U.S. PATENT DOCUMENTS

2022/0250385 A1 * 8/2022 Komatsu .................. B41J 2/175

FOREIGN PATENT DOCUMENTS

| | | | |
|---|---|---|---|
| JP | 2008-213358 | A | 9/2008 |
| JP | 2019-014152 | A | 1/2019 |
| JP | 2020-128081 | A | 8/2020 |
| KR | 100694121 | B1 | 3/2007 |
| KR | 101205834 | B1 | 11/2012 |
| KR | 10-20160031470 | A | 3/2016 |
| KR | 10-20160083433 | A | 7/2016 |

OTHER PUBLICATIONS

Office Action for Japanese Application No. 2022-206269 dated Nov. 21, 2023.

Korean Office Action, dated Aug. 30, 2023, issued in corresponding Korean Patent Application No. 10-2021-0192399.

* cited by examiner

CLEANING UNIT, SUBSTRATE PROCESSING APPARATUS INCLUDING THE SAME, AND HEAD CLEANING METHOD

CROSS-REFERENCE TO RELATED APPLICATIONS

This application claims priority under 35 U.S.C. § 119 to Korean Patent Application No. 10-2021-0192399 filed on Dec. 30, 2021 in the Korean Intellectual Property Office, the disclosures of which are incorporated by reference herein in their entireties.

BACKGROUND

Embodiments of the present disclosure described herein relate to a cleaning unit, a substrate processing apparatus including the cleaning unit, and a head cleaning method.

In recent years, display elements such as liquid crystal display elements, organic EL display elements, and the like are required to have high resolution. To manufacture a display element having high resolution, more pixels per unit area are necessarily formed on a substrate, and it is important to accurately eject ink to each of densely-arranged pixels. This is because otherwise, a display element manufactured with defects may be determined to be defective.

On the other hand, ink generally used to manufacture display elements has a property of being solidified without flowing. Also, as described above, the diameter of a nozzle formed in a head that ejects ink tends to be very small to eject ink to each of the densely-arranged pixels. Accordingly, there may occur a case where a nozzle having a very small diameter is clogged with solidified ink and cannot be used.

In addition, there may occur cases in which solidified ink adheres to the inside of the head as well as the outside of the head and cannot be removed. When solidified ink is attached to the inside of the head, a method of supplying high-pressure ink to the head and purging the inside of the head by ejecting ink from the head is used, but there may still be a case in which the solidified ink is not removed in spite of such a high-pressure purge operation. In this case, some nozzles are unusable. As the number of unusable nozzles increases, the number of substrates capable of being processed per unit time decreases, and the head replacement cycle is also shortened. In addition, there is a problem in that a very large amount of ink is consumed in the high-pressure purge operation.

SUMMARY

Embodiments of the present disclosure provide a cleaning unit capable of effectively performing head maintenance, a substrate processing apparatus including the cleaning unit, and a head cleaning method.

In addition, embodiments of the present disclosure provide a cleaning unit capable of effectively removing solidified ink (processing liquid) attached to the inside of a head, a substrate processing apparatus including the cleaning unit, and a head cleaning method.

In addition, embodiments of the present disclosure provide a cleaning unit capable of extending a head replacement cycle, a substrate processing apparatus including the cleaning unit, and a head cleaning method.

The objects of the present disclosure are not limited to the aforementioned objects, and any other objects not mentioned herein will be clearly understood from the following description by those skilled in the art.

The present disclosure provides a substrate processing apparatus. The substrate processing apparatus includes a head unit including a head having at least one nozzle for ejecting a treatment liquid to a substrate and a cleaning unit configured to clean the head, wherein the cleaning unit includes a first cleaning member that sprays a cleaning liquid to the head; and a second cleaning member that forms a suction space in combination with the head when being in close contact with the head, and removes impurities attached to the head by providing a reduced pressure to the suction space.

According to an embodiment, the second cleaning member includes a suction part facing a lower portion of the head and having at least one suction hole formed therein and a sealing part disposed above the suction part to maintain airtightness of the suction space.

According to an embodiment, the substrate processing apparatus may further include at least one suction line that transfers the reduced pressure to the suction hole and a pressure reducing member that transfers the reduced pressure to the suction line.

According to an embodiment, the suction line and the suction hole may be provided in plurality, and wherein each of the suction lines may be installed with a suction valve.

According to an embodiment, the substrate processing apparatus may further include a liquid supply unit that supplies the treatment liquid to the head unit, and a controller that controls the liquid supply unit, the head unit, and the cleaning unit, and the controller may control the liquid supply unit, the head unit, and the cleaning unit such that the first cleaning member supplies the cleaning liquid to the head unit and the second cleaning member comes into close contact with the head unit to form the suction space.

According to an embodiment, the controller may control the cleaning unit to remove the impurities attached to the head by providing the reduced pressure to the suction space.

According to an embodiment, the liquid supply unit may include a reservoir that accommodates the treatment liquid, a supply line that supplies the treatment liquid from the reservoir to the head; and a recovery line that recovers the treatment liquid from the head to the reservoir.

According to an embodiment, a supply valve may be installed in the supply line, and a recovery valve may be installed in the recovery line.

According to an embodiment, the controller may control the cleaning unit such that the supply valve and the recovery valve are closed while the pressure reducing member provides the reduced pressure to the suction space.

According to an embodiment, the controller may control the cleaning unit to open one of the suction valves and then open the other one of the suction valves.

According to an embodiment, the controller may control the liquid supply unit and the cleaning unit such that the liquid supply unit performs a purge operation of supplying the treatment liquid to the head while providing a reduced pressure to the suction space.

According to an embodiment, the first cleaning member may spray the cleaning liquid to the head in form of steam.

In addition, the present disclosure provides a cleaning unit for cleaning a head that ejects ink to a substrate. The cleaning unit may include a second cleaning member that forms a suction space in combination with the head when being in close contact with the head, and removes impurities attached to the head by providing the reduced pressure to the suction space.

According to an embodiment, the cleaning unit may further include a first cleaning member configured to spray the cleaning liquid to the head in form of steam.

According to an embodiment, the second cleaning member may include a suction unit facing a lower portion of the head and having at least one suction hole formed therein, and a sealing part disposed above the suction part to maintain airtightness of the suction space.

According to an embodiment, the cleaning unit may further include at least one suction line that transfers the reduced pressure to the suction part, and a pressure reducing member that transfers the reduced pressure to the suction line.

In addition, the present disclosure provides a method of cleaning a head having nozzles for ejecting a treatment liquid to a substrate. The method may include forming a suction space by bring a cleaning member, providing a reduced pressure, into close contact with a lower portion of the head, the suction space being defined by a combination of the head and the cleaning member and providing the reduced pressure to the suction space to remove impurities attached to the head.

According to an embodiment, the method may further include closing a valve of a liquid supply unit supplying the treatment liquid to the head when the reduced pressure is applied to the suction space.

According to an embodiment, a sealing part of the cleaning member may be in close contact with the head to maintain airtightness of the suction space when the cleaning member is in close contact with the head.

According to an embodiment, the method may further include spraying a cleaning liquid in form of steam to the lower portion of the head.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
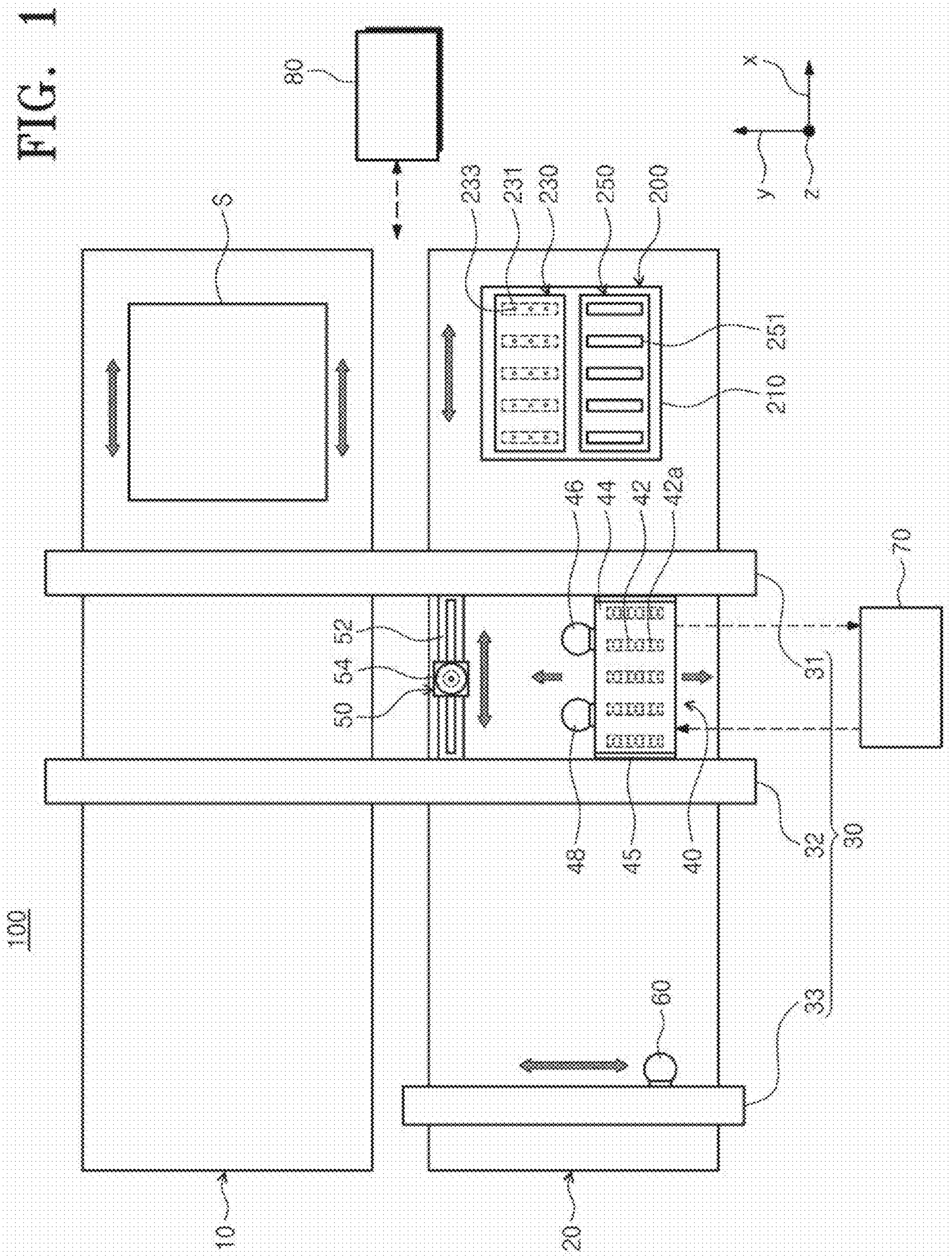
FIG. 1 is a view showing a substrate processing apparatus according to an embodiment of the present disclosure.

Hereinafter, with reference to the accompanying drawings, embodiments of the present disclosure will be described in detail such that those of ordinary skill in the art can easily carry out the present disclosure. However, the present disclosure may be embodied in several different forms and is not limited to the embodiments described herein. Further, in describing preferred embodiment of the present disclosure in detail, a detailed description of well-known functions or configurations will be ruled out in order not to unnecessarily obscure the gist of the present disclosure. In addition, the same reference numerals are used throughout the drawings for parts having similar functions and actions.

In addition, throughout the specification, unless explicitly described to the contrary, the word "comprise" or "comprising" will be understood to imply the inclusion of another elements but not the exclusion of any other elements. It will be further understood that the terms "comprises," "comprising," "having," "having," "includes," "including" and/or variations thereof, when used in this specification, specify the presence of stated features, integers, steps, operations, elements, and/or components, but do not preclude the presence or addition of one or more other features, integers, steps, operations, elements, components, and/or groups thereof.

As used herein, singular forms may include plural forms as well unless the context clearly indicates otherwise. In addition, shapes, sizes, and the like of elements in the drawings may be exaggerated for clearer description.

Terms such as first and/or second may be used to describe various elements, but the elements should not be limited by the terms. The terms may be used for the purpose of distinguishing one element from another. For example, without departing the scope of the disclosure, a first component may be referred to as a second component, and similarly, a second component may be referred to as a first component.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other expressions describing the relationship between components, such as "between" and "just between" or "adjacent to" and "directly adjacent to" should be interpreted as well.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to FIGS. 1 to 12.

FIG. 1 is a view showing a substrate processing apparatus according to an embodiment of the present disclosure. Referring to FIG. 1, a substrate processing apparatus 100 according to an embodiment of the present disclosure may be an inkjet apparatus that processes a substrate "S" by supplying a liquid chemical such as ink onto the substrate "S". For example, the substrate processing apparatus 100 may perform a printing process on the substrate "S" by discharging ink in the form of droplets (I, an example of processing liquid) on the substrate "S". Also, the substrate "S" may be a glass substrate. However, it is not limited thereto, and the type of substrate "S" may be variously modified.

The substrate processing apparatus 100 may include a printing area 10, a maintenance area 20, a gantry 30, a head unit 40, a nozzle alignment unit 50, a vision member 60, a liquid supply unit 70, a controller 80, and a head cleaning unit 200.

When viewed from above, the printing area 10 may have a longitudinal direction in the first direction "X". Hereinafter, when viewed from above, a direction perpendicular to the first direction "X" is referred to as a second direction "Y", and a direction perpendicular to the first direction "X" and the second direction "Y" is referred to as a third direction "Z". The third direction "Z" may be a direction perpendicular to the ground. Also, the first direction "X" may be a direction in which the substrate "S" to be described later is transferred. In the printing area 10, the head unit 40 to be described later may eject ink "I" in the form of droplets to the substrate "S", so that a printing process for the substrate "S" is performed.

In addition, the substrate "S" transported in the printing area 10 may be maintained in a floating state. Accordingly, in the printing area 10, a lifting stage capable of lifting the substrate "S" when transferring the substrate "S" may be provided. In addition, in the printing area 10, a transport portion for holding and transporting one side or both sides of the substrate "S" may be further provided. The aforementioned transport portion may include a guide rail provided along one or both sides of the floating stage, a gripper that slides along the guide rail while holding one or both sides of the substrate "S", and the like. Also, the substrate "S" transferred in the printing area 10 may be transferred along the first direction "X".

In the maintenance area 20, maintenance for the head unit 40 to be described later may be mainly performed. When viewed from above, the longitudinal direction of the maintenance area 20 may be the first direction "X". Also, the maintenance area 20 may be disposed parallel to the printing area 10. For example, the maintenance area 20 and the printing area 10 may be arranged side by side in the second direction "Y".

In addition, because the head unit 40 to be described later may eject ink "I" in the form of droplets in the maintenance area 20, the maintenance area 20 may have the same or similar process environment as the printing area 10.

The gantry 30 may be provided such that the head unit 40 to be described later or the vision member 60 to be described later is capable of linear reciprocating movement. The gantry 30 may include a first gantry 31, a second gantry 32, and a third gantry 33. The first gantry 31 and the second gantry 32 may be provided to have a structure extending along the printing area 10 and the maintenance area 20. In addition, the first gantry 31 and the second gantry 32 may be spaced apart from each other along the first direction "X". That is, the first gantry 31 and the second gantry 32 may be provided to have a structure extending in the second direction "Y" in which the printing area 10 and the maintenance area 20 are arranged such that the head unit 40 to be described later is capable of reciprocating between the printing area 10 and the maintenance area 20 in the second direction "Y".

In addition, the third gantry 33 may be provided to have a structure extending in the second direction "Y" along the maintenance area 10. That is, the third gantry 33 may be provided to have a structure extending such that the vision member 60 to be described later is capable of moving in the second direction "Y".

The head unit 40 may eject the ink "I" in the form of droplets onto the substrate "S". The ink "I" ejected from the head unit 40 may have a characteristic of being solidified after a certain period of time without flowing. The head unit 40 may perform a printing process on the substrate "S" by ejecting the ink "I" in the form of droplets onto the substrate "S". For example, the head unit 40 may perform the printing process on the substrate "S" by ejecting the ink "I" onto the substrate "S" while reciprocating in the second direction "Y". Specifically, when the head unit 40 is disposed at a first location when viewed from above, the substrate "S" may be transferred in the first direction "X" and pass through an area under the head unit 40. In this case, the head unit 40 may eject the ink "I" to the substrate "S". After the substrate "S" passes through the area under the head unit 40, the head unit 40 may move in the second direction "Y" and be disposed at a second location. Also, the substrate "S" may be moved in a direction opposite to a direction in which the head unit 40 is disposed at the first position, and again pass through the area under the head unit 40. In this case, the head unit 40 may eject the ink "I" to the substrate "S". An operation of ejecting, by the head unit 40, the ink "I" to the substrate "S" while the substrate "S" passes through the area under the head unit 40 may be referred to as one swath operation, and the printing process for the substrate "S" may be completed by performing the swath operation several times.

The head unit 40 may include a head 42, a head frame 44, a driving member 45, a first image member 46, and a second image member 48.

A plurality of nozzles **42*a* may be formed in the head 42 to eject the ink "I" in the form of droplets. At least one head 42 may be provided. For example, a plurality of heads 42 may be provided. The plurality of heads 42 may be arranged side by side in the first direction "X". The plurality of heads 42 may be fitted into the head frame 44. The head 42 may include a head body and a nozzle plate mounted under the head body and having the nozzles 42*a*** formed thereon.

Also, the driving member 45 may move the head frame 44. Specifically, the driving member 45 may be configured to move the head frame 44 in the second direction "Y", which is the longitudinal direction of the first gantry 31 and the second gantry 32. In addition, the driving member 45 may be configured to move the head frame 44 in the third direction "Z". The driving member 45 may bring the head frame 44 into close contact with a second cleaning member 250 to be described later by moving the head frame 44 in the third direction "Z".

Also, when viewed from above, the first image member 46 and the second image member 48 may be coupled to one side of the head frame 44. The first image member 46 and the second image member 48 may be arranged side by side in the first direction "X". The first image member 46 and the second image member 48 may enable identification of ink "I" in the form of droplets ejected from the head 42. The first image member 46 and the second image member 48 may be a camera including an image acquisition module.

The nozzle alignment unit 50 may be provided in the maintenance area 20. The nozzle alignment unit 50 may be provided between the first gantry 31 and the second gantry 32 when viewed from above. Accordingly, the nozzle alignment unit 50 may enable identification of the state of the nozzles **42*a* formed in the head 42. For example, the nozzle alignment unit 50 may include a moving rail 52 and a camera member 54. The longitudinal direction of the moving rail 52 may be the first direction "X". The camera member 54 may linearly reciprocate in the first direction "X", which is the longitudinal direction of the moving rail 52. The camera member 54 may capture images of the nozzles 42***a* of the head 42 while moving in the longitudinal direction of the moving rail 52.

The vision member 60 may be installed on the third gantry 33 so as to be movable in the second direction "Y", which is the longitudinal direction of the third gantry 33. The vision member 60 may be a camera including an image acquisition module. The vision member 60 may acquire an image of the ink "I" ejected onto a dummy substrate (not shown, a substrate used to check the amount of ink "I" ejected from head 42, the impact points of ink (I), or the like) that may be provided in the maintenance area 20, and transfer the acquired image to the controller 80 to be described later. The controller 80 may analyze an image acquired by the vision member 60 and calculate data for calibrating the dots of the ink droplets ejected by the head unit 40, a moving speed of the head 42, a moving speed of the substrate, and the like.

Figure 2:
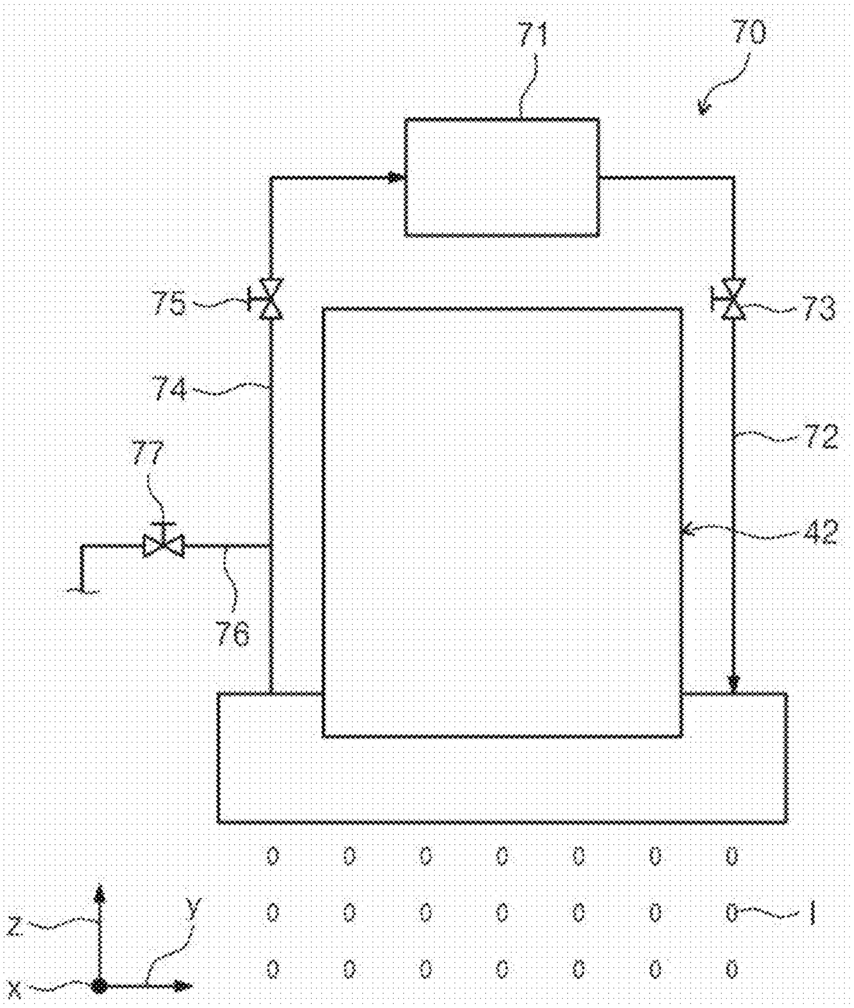
FIG. 2 is a view showing the appearance of the head and the supply unit of FIG. 1.

The liquid supply unit 70 may be configured to supply and/or recover ink "I", which is a treatment liquid, to the head unit 40. FIG. 2 is a view showing the appearance of the head and the supply unit of FIG. 1. Referring to FIG. 2, the liquid supply unit 70 may include a reservoir 71, a supply line 72, a supply valve 73, a recovery line 74, a recovery valve 75, a drain line 76, and a drain valve 77.

The reservoir 71 may have an accommodation space in which ink "I" is accommodated. An agitator may be installed in the reservoir 71 to impart fluidity to the ink "I" accommodated in the accommodation space to prevent the ink "I" from being solidified.

The supply line 72 may be configured to supply the ink "I" from the reservoir 71 to the head 42. The supply valve 73, which is an opening/closing valve or a flow control valve, may be installed in the supply line 72. When the head 42 is viewed in the first direction "X", the supply line 72 may be connected to one side of the head 42. The recovery line 74 may be configured to recover the ink "I" from the head 42 to the reservoir 71. The recovery valve 75 may be installed in the recovery line 74. The recovery line 74 may be connected to the other side of the head 42 when the head 42 is viewed in the first direction "X". The drain line 76 may be branched off from the recovery line 74. The drain valve 77 may be installed in the drain line 76. The drain line 76 may be branched off from the recovery line 74 to allow at least a portion of the ink "I" flowing into the recovery line 74 to be discharged to the outside of the substrate processing apparatus 100. In addition, a pressure regulator capable of adjusting the pressure of the accommodation space may be provided in the reservoir 71. Depending on the pressure in the accommodation space and the opening and closing of the supply valve 73, the recovery valve 75, and the drain valve 77, the ink "I" may be supplied to the head 42 or recovered from the head 42.

Referring back to FIG. 1, the controller 80 may control the substrate processing apparatus 100. The controller 80 may control the substrate processing apparatus 100 such that the substrate processing apparatus 100 performs a treatment process on the substrate "S". For example, the controller 80 may control the substrate processing apparatus 100 such that the substrate processing apparatus 100 performs a printing process on the substrate "S". Also, the controller 80 may control the head unit 40, the supply unit 70, and the cleaning unit 200 of the substrate processing apparatus 100.

In addition, the controller 80 may include a process controller including a microprocessor (computer) that performs control on the substrate processing apparatus 100, a user interface including a keyboard through which an operator inputs commands to manage the substrate processing apparatus 100 and the like, a display that visualizes and displays the operation status of the substrate processing apparatus 100 or the like, a storage storing a control program for executing processes executed in the substrate processing apparatus 100 under control of a process controller, a program for causing each component to perform processing according to a variety of data and processing conditions, that is, a processing recipe. Also, the user interface and the storage may be connected to the process controller. The processing recipe may be stored in a storage medium of the storage, and the storage medium may be a hard disk, a portable disk such as a CD-ROM or a DVD, or a semiconductor memory such as a flash memory.

The cleaning unit 200, which is a unit that cleans the head, may be installed in the maintenance area 20. The cleaning unit 200 may be configured to be movable in the maintenance area 20. For example, the cleaning unit 200 may be configured to be movable in the first direction "X" in the maintenance area 20. For example, the cleaning unit 200 may be configured to movable in a direction parallel to the moving direction of the substrate "S" in the printing area 10. The cleaning unit 200 may perform maintenance on the head 42, specifically cleaning the head 42.

The cleaning unit 200 may include a stage 210, a first cleaning member 230, and the second cleaning member 250. The first cleaning member 230 and the second cleaning member 250 may be installed on the stage 210. The stage 210 may be configured to be movable in the maintenance area 20. The stage 210 may be configured to be movable in the first direction "X" in the maintenance area 20. Optionally, the stage 210 may be configured to be movable in the first direction "X" and/or the second direction "Y". The stage 210 may be configured to change the positions of the first cleaning member 230 and the second cleaning member 250.

The first cleaning member 230 may spray cleaning liquid in the form of steam to the head 42. The first cleaning member 230 may spray a cleaning liquid in the form of steam, for example, water, or a cleaning liquid containing a chemical that is easy to remove the ink "I", to the head 42. The form of steam may mean a form in which very small particles of the cleaning liquid are sprayed in the form of a mist, and the temperature thereof is high. The temperature of the cleaning liquid sprayed in the form of steam may be higher than the temperature of the ink "I" ejected onto the substrate "S". The cleaning liquid in the form of steam sprayed onto the head 42 may lower the degree of solidification of the solidified ink that may be attached to the head 42. That is, the cleaning liquid may reduce the adhesion of ink that may be attached to the head 42.

The first cleaning member 230 may include one or more cleaning parts 231. When viewed from above, the cleaning parts 231 may be arranged side by side in the first direction "X". The distance between the cleaning parts 231 may be the same as or similar to the distance between the heads 42. Each of the cleaning parts 231 may be provided to correspond to each of the heads 42.

Figure 3:
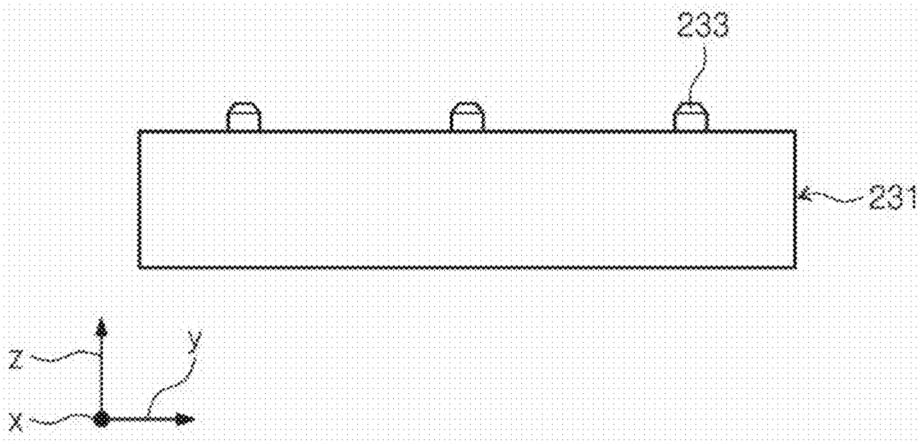
FIG. 3 is view a schematically showing a first cleaning member of the cleaning unit of FIG. 1.

FIG. 3 is a view schematically showing a first cleaning member of the cleaning unit of FIG. 1. Specifically, in FIG. 3, any one of the cleaning parts 231 may be shown. The cleaning part 231 may include one or more cleaning nozzles 233, and the cleaning nozzle 233 may be configured to spray a cleaning liquid in the form of steam. For example, a plurality of cleaning nozzles 233 may be provided. The cleaning part 231 may include a heating member (not shown) that heats the cleaning liquid sprayed from the cleaning nozzle 233.

Referring back to FIG. 1, when the second cleaning member 250 comes into close contact with the head 42, the second cleaning member 250 may be combined with the head 42 to form a suction space VA, and provide a reduced pressure to the suction space VA to remove solidified ink (impurities) adhering to the outside of the head 42 and/or the inside of the head 42.

The second cleaning member 250 may include at least one suction part 251. When viewed from above, the suction parts 251 may be arranged side by side in the first direction "X". A distance between the suction parts 251 may be the same as or similar to a distance between the heads 42. Each of the suction parts 251 may be provided to correspond to each of the heads 42.

Figure 4:
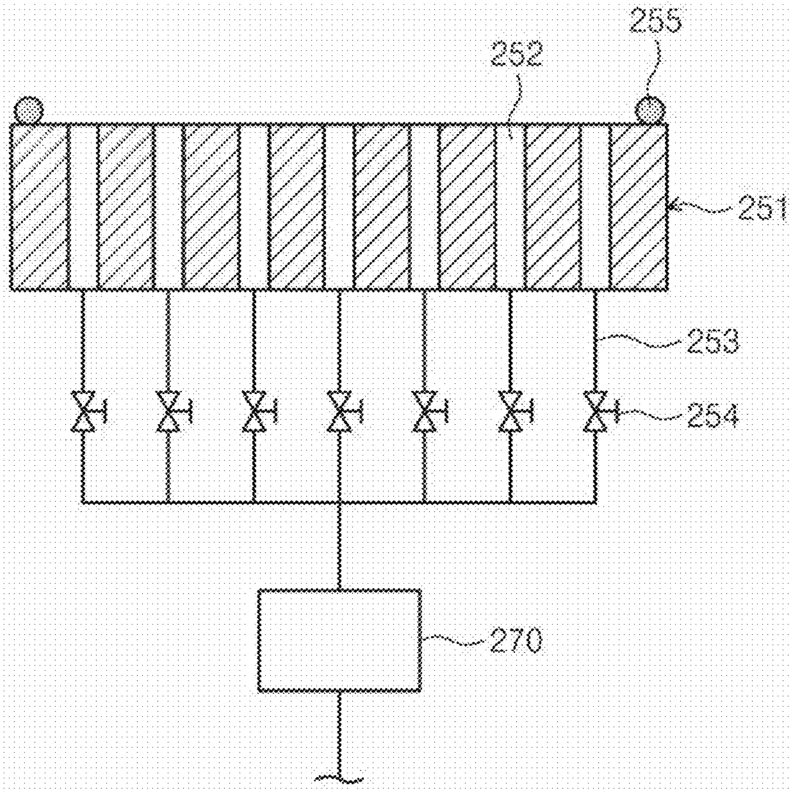
FIG. 4 is view a schematically showing a second cleaning member of the cleaning unit of FIG. 1.

FIG. 4 is a view schematically showing a second cleaning member of the cleaning unit of FIG. 1. Referring to FIG. 4, the second cleaning member 250 may include the suction part 251, a suction line 253, a suction valve 254, a sealing part 255, and a pressure reducing member 270. The suction line 253, the suction valve 254, the sealing part 255, and the pressure reducing member 270 may be provided in plurality to correspond to each suction part 251.

A suction hole 252 may be formed in the suction part 251. The suction hole 252 may provide a reduced pressure to the suction space VA, which will be described later. The suction hole 252 may be formed to face a lower portion of the head 42, specifically, the nozzle 42*a* formed in the head 42. A plurality of suction holes 252 may be formed. The suction line 253 may be connected to the suction hole 252. A plurality of suction lines 253 may be provided. The suction lines 253 may be respectively connected to the suction holes 252. The suction line 253 may deliver a reduced pressure to the suction hole 252. The suction valve 254 may be installed in each suction line 253. The suction valve 254 may be an on-off valve or a flow control valve. The suction line 253 may be connected to the pressure reducing member 270. The pressure reducing member 270 may be a pump that provides a vacuum pressure, but is not limited thereto, and the type of pressure reducing member 270 may be variously modified as a known device that provides a reduced pressure.

The sealing part 255 may be provided above the suction part 251. The sealing part 255 may be an O-ring. The sealing part 255 may be provided with a material having elasticity. The sealing part 255 may be provided with a material including rubber. When viewed from above, the sealing part 255 may be configured to surround the suction holes 252 formed in the suction part 251. When the second cleaning member 250 cleans the head 42, the sealing part 255 may be configured to surround the corresponding nozzles 42*a* formed in the head 42 when viewed from above.

Hereinafter, a head cleaning method according to an embodiment of the present disclosure will be described. The head cleaning method may be implemented by the cleaning unit 200 of the substrate processing apparatus 100. In addition, the controller 80 may control the components of the substrate processing apparatus 100, for example, the head unit 40, the supply unit 70, and the cleaning unit 200 such that the substrate processing apparatus 100 is able to perform the head cleaning method described below.

Figure 5:
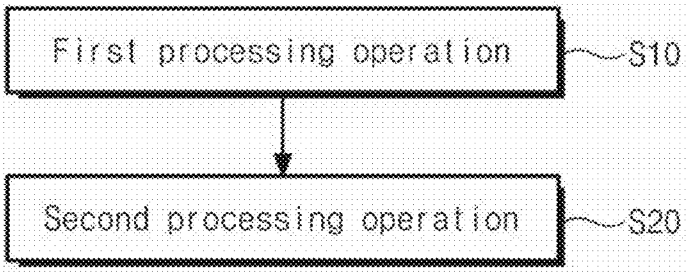
FIG. 5 is a flowchart schematically illustrating a head cleaning method according to an embodiment of the present disclosure.

FIG. 5 is a flowchart schematically illustrating a head cleaning method according to an embodiment of the present disclosure. Referring to FIG. 5, a head cleaning method according to an embodiment of the present disclosure may include a first processing operation (S10) and a second processing operation (S20). The first processing operation (S10) and the second processing operation (S20) may be sequentially performed.

Figure 6:
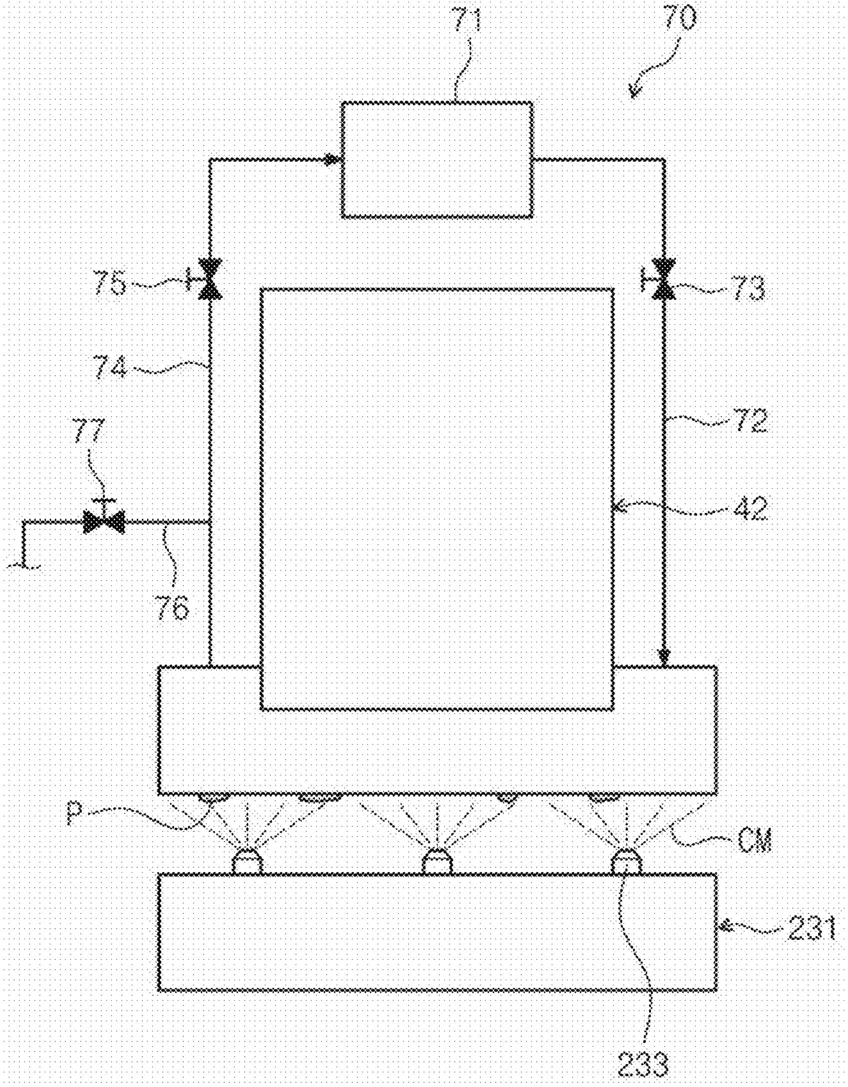
FIG. 6 is a view schematically showing a substrate processing apparatus performing the first processing operation of FIG. 5.

In the first processing operation (S10), the first cleaning member 230 may spray cleaning liquid CM in the form of steam to the lower portion of the head 42 (see FIG. 6). In the first processing operation (S10), the stage 210 of the cleaning unit 200 and the driving member 45 of the head unit 40 may change the positions of the first cleaning member 230 and the head 42. In the first processing operation (S10), the first cleaning member 230 may be disposed in an area below the corresponding head 42. The cleaning liquid CM in the form of steam supplied to the lower portion of the head 42 may lower the degree of solidification of impurities "P" such as the solidified ink "I". Accordingly, the adhesion of the ink "I" may be lowered. In addition, because the cleaning liquid CM is supplied in the form of steam, the cleaning liquid CM penetrates not only the outside of the head 42, but also the inside of the head 42, specifically, the inside of the nozzle 42*a* to lower the adhesion of the solidified ink "I" attached to the nozzle 42*a*. In this case, the supply valve 73, the recovery valve 75, and the drain valve 77 may be closed.

Figure 7:
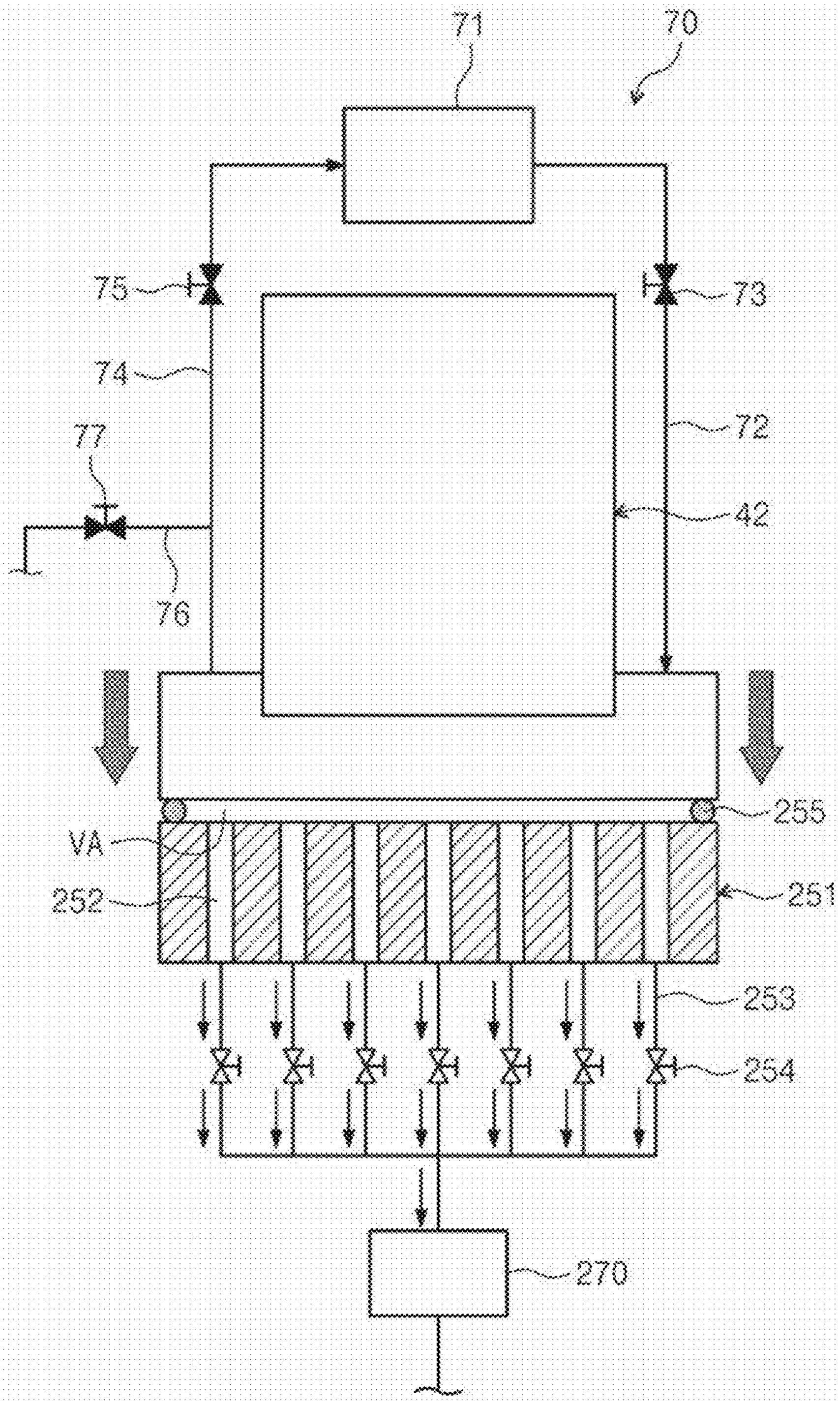
FIG. 7 is a view schematically showing an example of a substrate processing apparatus performing the second processing operation of FIG. 5.

In the second processing operation (S20), the suction space VA may be formed by bringing the second cleaning member 250 providing a reduced pressure into close contact with the lower portion of the head 42 (see FIG. 7). The suction space VA may be defined by combining the lower portion of the head 42, the upper portion of the suction part 251, and the sealing part 255 with each other. The sealing part 255 may maintain airtightness of the suction space VA. Also, the head 42 may be moved downward by the driving member 45. Accordingly, the second cleaning member 250 and the head 42 may come into close contact with each other to form the suction space VA. Thereafter, the pressure reducing member 270 may provide a reduced pressure to the suction line 253 to provide the reduced pressure to the suction space VA. In this case, the supply valve 73, the recovery valve 75, and the drain valve 77 may be closed. Also, the suction valves 254 may also be open. Accordingly, impurities "P" attached to the head 42 may be discharged to the outside through the suction line 253.

According to an embodiment of the present disclosure, in the first processing operation (S10), the cleaning liquid CM in the form of steam is sprayed to the head 42 to weaken the degree of solidification and adhesion of the impurities "P" such as the solidified ink "I" (that is, the solidified ink "I" may be changed from a solidified state to a liquefied state). As a result, impurities "P" may be more effectively removed from the head 42.

In addition, in the second processing operation (S20), the second cleaning member 250 is in close contact with the head 42 (specifically, the nozzle plate of the head 42) to form the suction space VA, and the airtightness of the suction space VA may be maintained by the sealing part 255. Accordingly, it is possible to solve the problem that impurities "P" separated from the head 42 spread in all directions. In addition, as the airtightness of the suction space VA is maintained, the reduced pressure transferred to the suction space VA may be delivered to the inside of the head 42 more effectively. Accordingly, the impurities "P" adhering to the inside of the head 42 may be effectively removed. That is, according to an embodiment of the present disclosure, it is possible to effectively remove solids inside the head 42 through suction after a sealed space has been formed.

Figure 8:
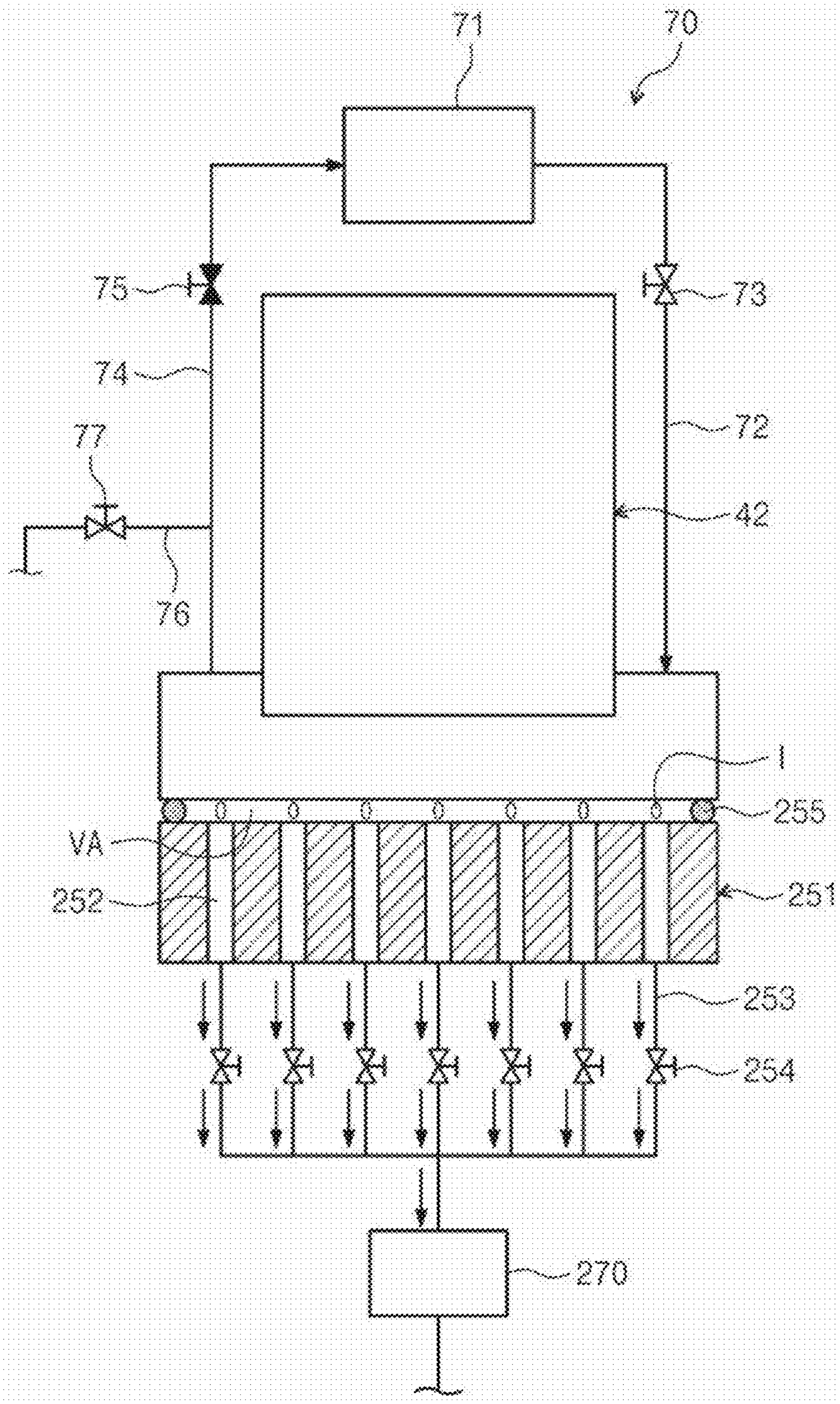
FIG. 8 is a view schematically showing another example of a substrate processing apparatus performing the second processing operation of FIG. 5.
Figure 9:
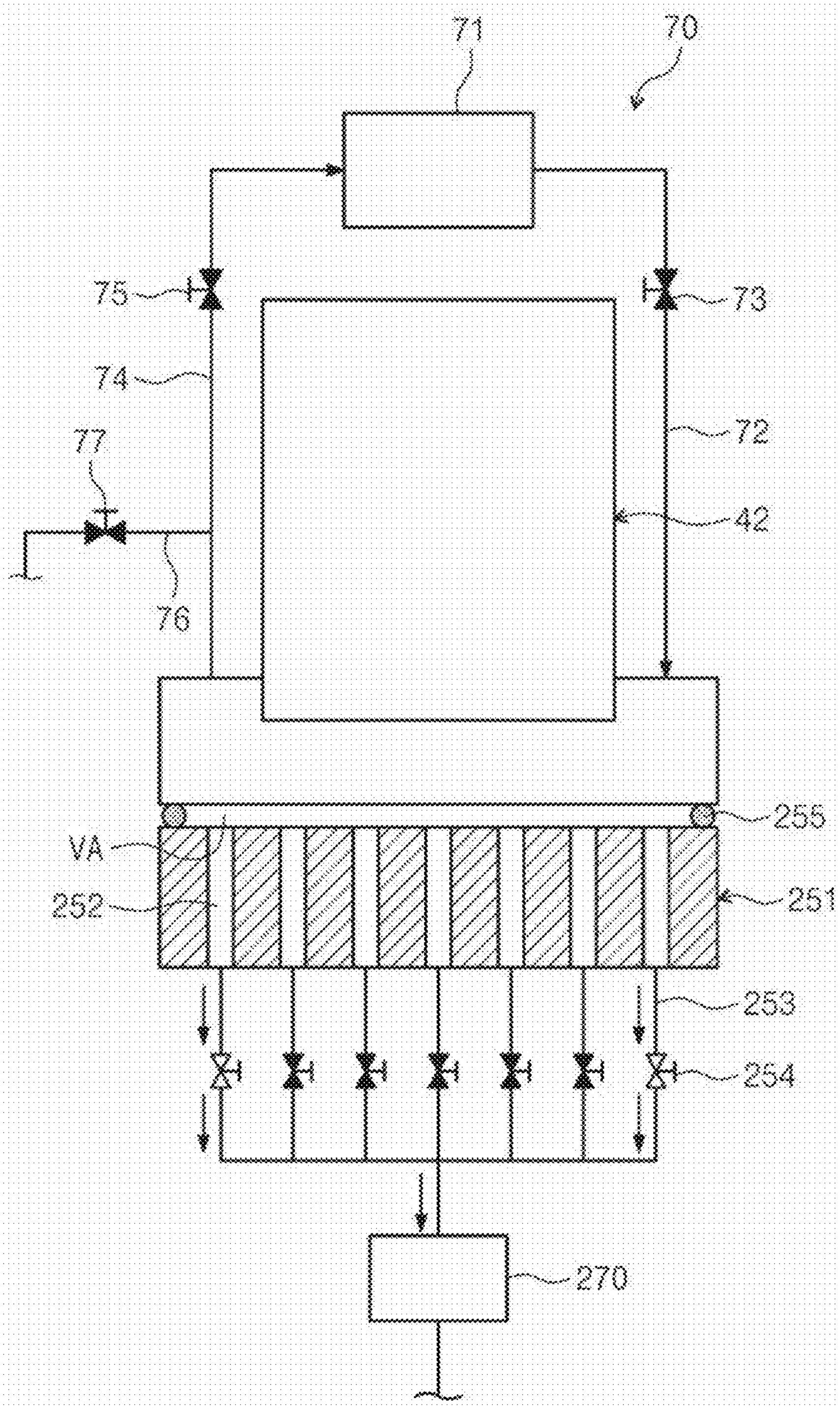
FIGS. 9 to 12 are views schematically showing another example of a substrate processing apparatus performing the second processing operation of FIG. 5.
Figure 10:
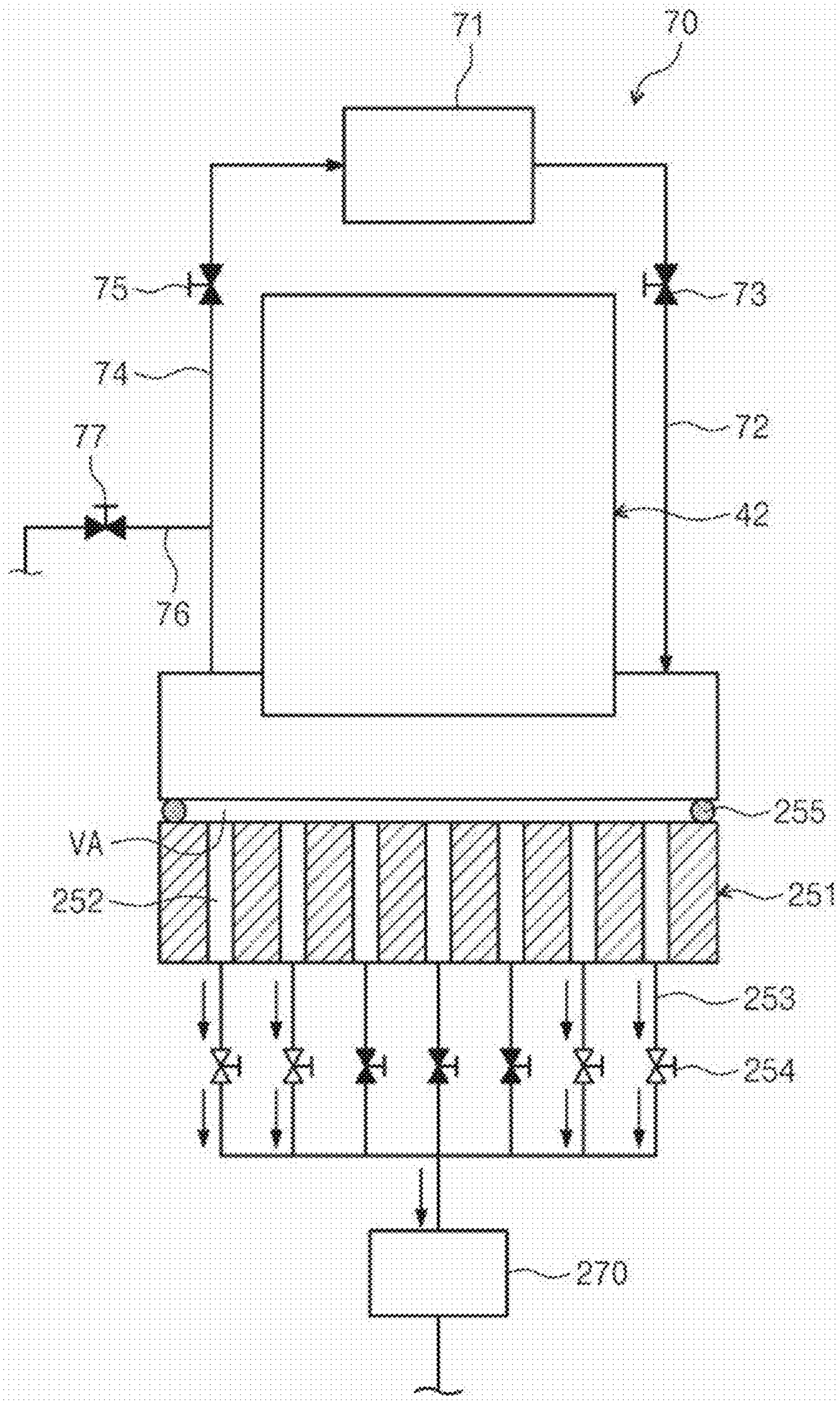
Figure 11:
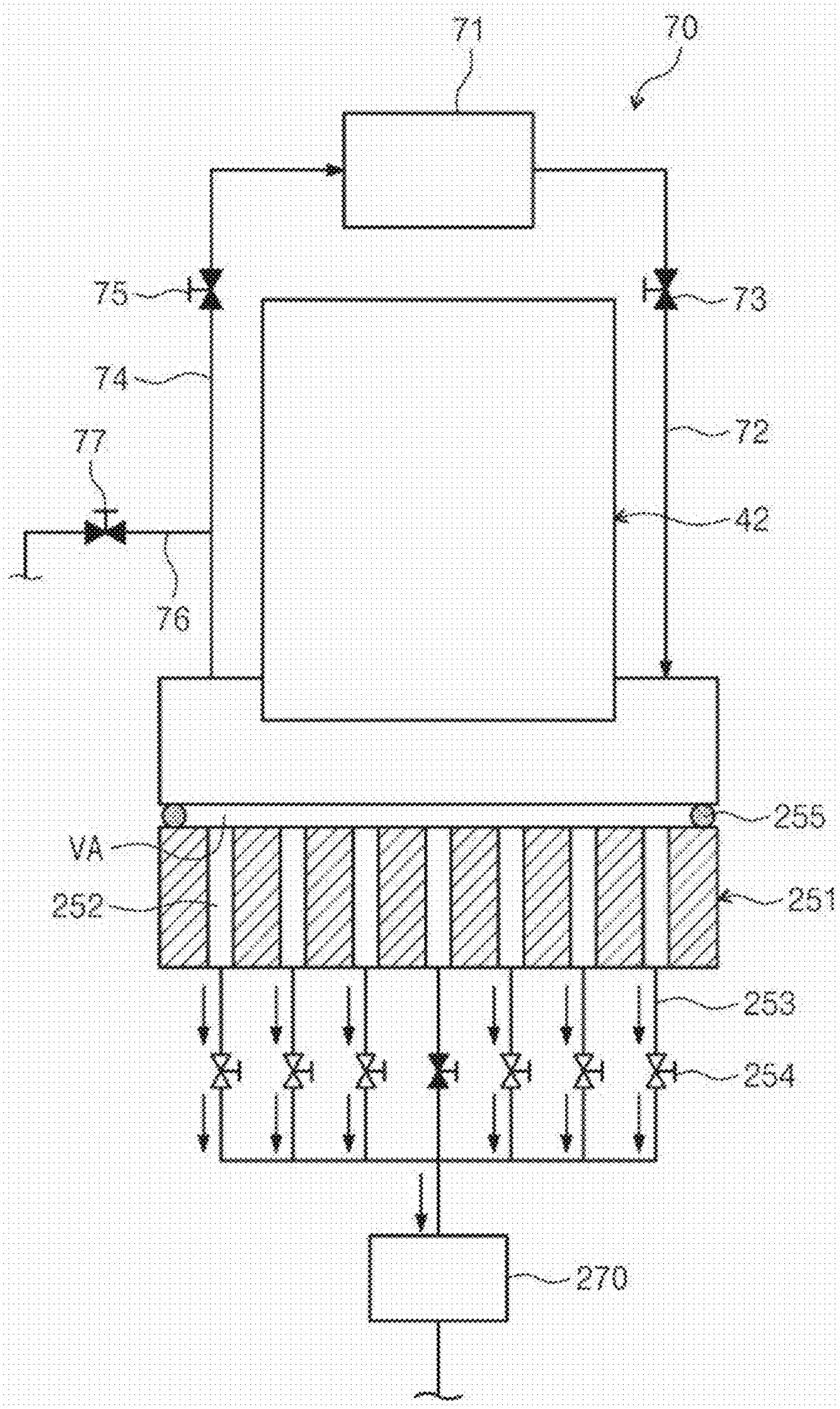
Figure 12:
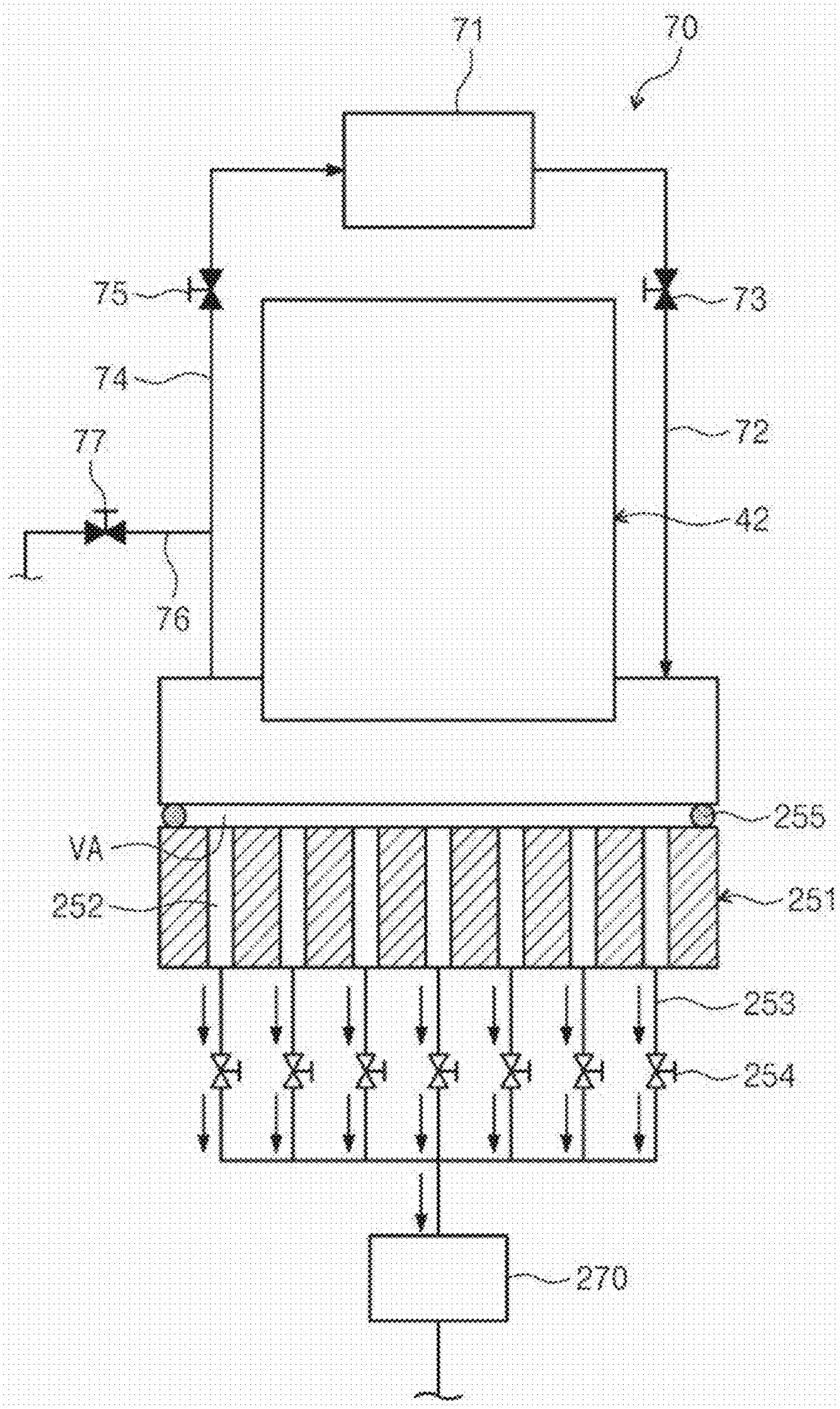

In the above example, the case where the second cleaning member 250 provides a reduced pressure to the suction space VA in a state where the supply valve 73 and the drain valve 77 are closed has been described as an example, but the present disclosure is not limited thereto. For example, as shown in FIG. 8, the liquid supply unit 70 may supply the ink "I" to the head 42 while a reduced pressure is being provided to the suction space VA, thereby perform a purge operation of purging the inside of the head 42. In this case, the second cleaning member 250 may provide a reduced pressure to the suction space VA in a state in which the supply valve 73 and the drain valve 77 are closed.

In the above example, the case where all of the suction valves 254 are opened when providing a reduced pressure to the suction space VA has been described as an example, but the present disclosure is not limited thereto.

For example, as shown in FIGS. 9 to 12, when providing a reduced pressure to the suction space VA, the suction valves 254 installed in the suction line 253 that provides a reduced pressure to the suction hole 252 close to the sealing part 255 may be first opened, and thereafter, the suction valves 254 installed in the suction line 253 that provides a reduced pressure to the suction hole 252 distant from the sealing part 255 among the suction valves 254 may be sequentially opened. That is, the suction valves 254 may be sequentially opened from the suction valve 254 close to the sealing part 255 to the suction valve 254 distant from the sealing part 255. In this case, directionality is imparted to the suction airflow in the suction space VA, thus minimizing a problem in which the attachment P introduced into the suction space VA is attached to the head 42 or the suction part 251 and is not removed. That is, when one of the suction valves 254 is opened, and then the other suction valve 254 of the suction valves 254 is sequentially opened, the problem may be minimized in which the attachment P introduced into the suction space VA is attached to the head 42 or the suction part 251 and is not removed.

In addition, there may be considered an embodiment of sequentially opening from the suction valve 254 distant from the sealing part 255 to the suction valve 254 close to the sealing part 255, an embodiment of sequentially opening from the suction valve 254 close to the supply line 72 to the suction valve 254 close to the recovery line 74, and an embodiment of sequentially opening from sequentially opening from the suction valve 254 close to the recovery line 74 to the suction valve 254 close to the supply line 72.

In the above example, the case where the head 42 moves downward and comes into close contact with the second cleaning member 250 has been described as an example, but the present disclosure is not limited thereto. For example, the second cleaning member 250 may move upward and come into close contact with the head 42. In this case, the second cleaning member 250 may further include an elevating member.

The above description is illustrative of the present disclosure. Also, the above disclosure is intended to illustrate and explain the preferred embodiments of the present disclosure, and the present disclosure may be used in various other combinations, modifications, and environments. In other words, the present disclosure may be changed or modified within the scope of the concept of the present disclosure disclosed herein, within the equivalent scope of the disclosure, and/or within the skill and knowledge of the art. The described embodiments illustrate the best state of the art to implement the technical idea of the present disclosure, and various changes may be made thereto as being demanded for specific applications and uses of the present disclosure. Accordingly, the above description is not intended to limit the present disclosure to the embodiments. Also, the appended claims should be construed as encompassing such other embodiments.

According to an embodiment of the present disclosure, it is possible to effectively perform maintenance of the head.

In addition, according to an embodiment of the present disclosure, it is possible to effectively remove solidified ink (processing liquid) attached to the inside of the head.

In addition, according to an embodiment of the present disclosure, the head replacement cycle may be extended.

The effects of the present disclosure are not limited to the above-mentioned effects, and the effects not mentioned will be clearly understood by those of ordinary skill in the art to which the present disclosure belongs from the present specification and the accompanying drawings.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A substrate processing apparatus, comprising:

a head unit including a head having at least one nozzle for ejecting a treatment liquid to a substrate; and a cleaning unit configured to clean the head, wherein the cleaning unit includes a stage configured to move in at least one horizontal direction;

a first cleaning member on the stage, the first cleaning member configured to spray a cleaning liquid to the head;

a second cleaning member on the stage the second cleaning member configured to form a suction space in combination with the head when being in close contact with the head, and remove impurities attached to the head by providing a reduced pressure to the suction space, a liquid supply unit configured to supply the treatment liquid to the head unit; and a controller configured to control the liquid supply unit, the head unit, and the cleaning unit, wherein the second cleaning member includes a suction part facing a lower portion of the head and having a plurality of suction holes formed therein; and a sealing part disposed above the suction part to maintain airtightness of the suction space, wherein the controller is configured to control the cleaning unit to remove the impurities attached to the head by providing the reduced pressure to the suction space, wherein the reduced pressure is first provided to the suction space via a first suction hole of the plurality of suction boles close to the sealing part and is then provided to the suction space via a second suction hole of the plurality of suction holes, which is relatively farther from the sealing part compared to the first suction hole.

2. The substrate processing apparatus of claim 1, further comprising:

a plurality of suction lines configured to transfer the reduced pressure to the plurality of suction holes; and a pressure reducing member configured to transfer the reduced pressure to the plurality of suction lines.

3. The substrate processing apparatus of claim 2, wherein each of the suction lines is installed with a suction valve.

4. The substrate processing apparatus of claim 3, wherein the controller is configured to control the liquid supply unit, the head unit, and the cleaning unit such that the first cleaning member supplies the cleaning liquid to the head unit and the second cleaning member comes into close contact with the head unit to form the suction space.

5. The substrate processing apparatus of claim 4, wherein the liquid supply unit includes:

a reservoir configured to accommodate the treatment liquid;

a supply line configured to supply the treatment liquid from the reservoir to the head; and a recovery line configured to recover the treatment liquid from the head to the reservoir.

6. The substrate processing apparatus of claim 5, wherein a supply valve is installed in the supply line, and wherein a recovery valve is installed in the recovery line.

7. The substrate processing apparatus of claim 6, wherein the controller is configured to control the cleaning unit such that the supply valve and the recovery valve are closed while the pressure reducing member provides the reduced pressure to the suction space.

8. The substrate processing apparatus of claim 4, wherein the controller is configured to control the cleaning unit to open one of the suction valves and then open the other one of the suction valves.

9. The substrate processing apparatus of claim 4, wherein the controller is configured to control the liquid supply unit and the cleaning unit such that the liquid supply unit performs a purge operation of supplying the treatment liquid to the head while providing the reduced pressure to the suction space.

10. The substrate processing apparatus of claim 1, wherein the first cleaning member is configured to spray the cleaning liquid to the head in form of steam.

11. A cleaning unit for cleaning a head that ejects ink to a substrate, comprising:

a stage configured to move in at least one horizontal direction;

a first cleaning member on the stage, the first cleaning member configured to spray a cleaning liquid to the head in form of steam; and a second cleaning member on the stage, the second cleaning member configured to form a suction space in combination with the head when being in close contact with the head, and remove impurities attached to the head by providing a reduced pressure to the suction space, wherein the second cleaning member includes a suction part facing a lower portion of the head and having a plurality of suction hole formed therein; and a sealing part disposed above the suction part to maintain airtightness of the suction space, wherein the reduced pressure is first provided to the suction space via a first suction hole of the plurality of suction holes close to the sealing part and is then provided to the suction space via a second suction hole of the plurality of suction boles, which is relatively farther from the scaling part compared to the first suction hole.

12. The cleaning unit of claim 11, further comprising:

a plurality of suction lines configured to transfer the reduced pressure to a plurality of suction parts; and a pressure reducing member configured to transfer the reduced pressure to the suction lines.

* * * * *